United States Patent
Hill et al.

(10) Patent No.: US 11,443,206 B2
(45) Date of Patent: Sep. 13, 2022

(54) ADAPTIVE FILTERING AND MODELING VIA ADAPTIVE EXPERIMENTAL DESIGNS TO IDENTIFY EMERGING DATA PATTERNS FROM LARGE VOLUME, HIGH DIMENSIONAL, HIGH VELOCITY STREAMING DATA

(71) Applicant: TIBCO Software Inc., Palo Alto, CA (US)

(72) Inventors: Thomas Hill, Tulsa, OK (US); Michael O'Connell, Durham, NC (US); Daniel J Rope, Reston, VA (US)

(73) Assignee: TIBCO Software Inc., Palo Alto, CA (US)

( * ) Notice: Subject to any disclaimer, the term of this patent is extended or adjusted under 35 U.S.C. 154(b) by 331 days.

(21) Appl. No.: 16/751,051

(22) Filed: Jan. 23, 2020

(65) Prior Publication Data
US 2021/0103832 A1   Apr. 8, 2021

Related U.S. Application Data

(63) Continuation-in-part of application No. 16/501,120, filed on Mar. 11, 2019, now abandoned, which is a
(Continued)

(51) Int. Cl.
*G06F 16/24* (2019.01)
*G06N 5/04* (2006.01)
(Continued)

(52) U.S. Cl.
CPC ........... *G06N 5/04* (2013.01); *G06F 16/2474* (2019.01); *G06F 16/26* (2019.01); *G06F 16/285* (2019.01); *G06F 16/9035* (2019.01); *G06N 20/00* (2019.01)

(58) Field of Classification Search
CPC .......... G06F 16/24568; G06F 16/2474; G06F 16/26; G06F 16/285; G06F 16/90;
(Continued)

(56) References Cited

U.S. PATENT DOCUMENTS 6,055,536 A     4/2000  Shimakawa et al.
7,249,048 B1    7/2007  O'Flaherty
(Continued)

FOREIGN PATENT DOCUMENTS

WO     2016153790 A1    9/2016

OTHER PUBLICATIONS

Duncan, Acheson J., Quality Control and Industrial Statistics, 5th Edition, 1986, Section 3.1, Chapter 31 (Analyses Associated with Analysis of Variances), pp. 765-788.
(Continued)

*Primary Examiner* — Merilyn P Nguyen
(74) *Attorney, Agent, or Firm* — McGuireWoods LLP

(57) ABSTRACT

A system for identifying information in high dimensional, low latency streaming data having dynamically evolving data patterns. The system processes, continuously and in real-time, the streaming data. Processing includes filtering the data based on event data to identify diagnostic data points by comparing the event data with an experimental design matrix and performing a modeling operation using the identified diagnostic data points in order to identify efficiently any current and emerging patterns of relationships between at least one outcome variable and predictor variables. The at least one a-priori, pre-designed experimental design matrix is generated based on combinations of the predictor variables and at least one outcome variable. The experimental design matrix is also generated based on at least one of main effects, limitations, constraints, and interaction effects of the predictor variables and combinations.

14 Claims, 3 Drawing Sheets

Related U.S. Application Data continuation-in-part of application No. 15/941,911, filed on Mar. 30, 2018, now Pat. No. 10,248,110, which is a continuation-in-part of application No. 15/237,978, filed on Aug. 16, 2016, now Pat. No. 10,386,822, and a continuation-in-part of application No. 15/214,622, filed on Jul. 20, 2016, and a continuation-in-part of application No. 15/186,877, filed on Jun. 20, 2016, now Pat. No. 10,839,024, and a continuation-in-part of application No. 15/139,672, filed on Apr. 27, 2016, now Pat. No. 10,467,226, and a continuation-in-part of application No. 15/067,643, filed on Mar. 11, 2016, now Pat. No. 10,671,603, and a continuation-in-part of application No. 14/826,770, filed on Aug. 14, 2015, now Pat. No. 10,649,973, and a continuation-in-part of application No. 14/690,600, filed on Apr. 20, 2015, now Pat. No. 9,952,577, and a continuation-in-part of application No. 14/666,918, filed on Mar. 24, 2015, now Pat. No. 10,007,681, and a continuation-in-part of application No. 14/665,292, filed on Mar. 23, 2015, now Pat. No. 10,481,919.

(51) Int. Cl.
  *G06F 16/2458* (2019.01)
  *G06F 16/26* (2019.01)
  *G06F 16/28* (2019.01)
  *G06N 20/00* (2019.01)
  *G06F 16/9035* (2019.01)

(58) Field of Classification Search
  CPC . G06F 16/9035; G06F 2201/86; G06N 20/00; G06N 5/04
  See application file for complete search history.

(56) References Cited

U.S. PATENT DOCUMENTS

| | | | |
|---|---|---|---|
| 7,383,238 B1 | 6/2008 | Iverson | |
| 7,389,151 B2 | 6/2008 | Badami et al. | |
| 8,838,654 B1 | 6/2014 | Hannah et al. | |
| 9,037,464 B1 | 5/2015 | Milolov et al. | |
| 9,952,577 B2 | 4/2018 | Hill et al. | |
| 10,007,681 B2* | 6/2018 | Hill | G06F 16/211 |
| 10,176,435 B1 | 1/2019 | Sarkar et al. | |
| 10,599,957 B2* | 3/2020 | Walters | G06F 9/541 |
| 10,803,214 B1* | 10/2020 | Jones | G06F 17/18 |
| 2002/0013664 A1 | 1/2002 | Strackekjan et al. | |
| 2003/0044821 A1 | 3/2003 | Bader et al. | |
| 2003/0055826 A1 | 3/2003 | Graham | |
| 2004/0024750 A1 | 2/2004 | Ulyanov et al. | |
| 2004/0103108 A1 | 5/2004 | Andreev et al. | |
| 2005/0060325 A1 | 3/2005 | Bakalash et al. | |
| 2005/0091263 A1 | 4/2005 | Wallace | |
| 2005/0143853 A1 | 6/2005 | Akimori et al. | |
| 2005/0192783 A1 | 9/2005 | Lystad et al. | |
| 2005/0216114 A1 | 9/2005 | Hsiung et al. | |
| 2007/0198328 A1 | 8/2007 | Fuller et al. | |
| 2007/0239660 A1 | 10/2007 | Tien et al. | |
| 2007/0240648 A1 | 10/2007 | Badami et al. | |
| 2008/0201117 A1 | 8/2008 | Wong et al. | |
| 2008/0313161 A1 | 12/2008 | Ramsey et al. | |
| 2009/0088883 A1 | 4/2009 | Baier et al. | |
| 2009/0125155 A1 | 5/2009 | Hill et al. | |
| 2009/0228846 A1 | 9/2009 | McConachy et al. | |
| 2009/0287675 A1 | 11/2009 | Dorrell et al. | |
| 2009/0307032 A1 | 12/2009 | Tribe et al. | |
| 2010/0082517 A1 | 4/2010 | Schapker, III et al. | |
| 2010/0100419 A1 | 4/2010 | Natoli et al. | |
| 2010/0217669 A1 | 8/2010 | Gazdzinski | |
| 2011/0046970 A1 | 2/2011 | Fontenot | |
| 2011/0161371 A1 | 6/2011 | Thomson et al. | |
| 2011/0276169 A1 | 11/2011 | Bourg, Jr. et al. | |
| 2011/0307223 A1 | 12/2011 | Kasabov | |
| 2012/0005190 A1 | 1/2012 | Faerber et al. | |
| 2012/0330618 A1 | 12/2012 | Austin | |
| 2013/0013370 A1 | 1/2013 | Mithal et al. | |
| 2013/0103174 A1 | 4/2013 | Stahley | |
| 2013/0125057 A1 | 5/2013 | Kashik et al. | |
| 2013/0166490 A1 | 6/2013 | Elkins et al. | |
| 2013/0282626 A1 | 10/2013 | White et al. | |
| 2014/0135970 A1 | 5/2014 | Kaushal et al. | |
| 2014/0172871 A1 | 6/2014 | Brayman et al. | |
| 2014/0195466 A1 | 7/2014 | Phillipps et al. | |
| 2014/0278754 A1 | 9/2014 | Cronin et al. | |
| 2014/0282227 A1 | 9/2014 | Nixon et al. | |
| 2014/0310285 A1 | 10/2014 | Chan et al. | |
| 2014/0344193 A1 | 11/2014 | Bilenko et al. | |
| 2014/0350856 A1* | 11/2014 | Lambie | G01W 1/00 702/3 |
| 2014/0358825 A1 | 12/2014 | Phillipps et al. | |
| 2014/0358828 A1 | 12/2014 | Phillipps et al. | |
| 2015/0006122 A1 | 1/2015 | Du | |
| 2015/0199616 A1 | 7/2015 | Rajendraprasad | |
| 2015/0253749 A1 | 9/2015 | Kniazev et al. | |
| 2015/0254330 A1 | 9/2015 | Chan et al. | |
| 2015/0317337 A1 | 11/2015 | Edgar | |
| 2015/0339572 A1 | 11/2015 | Achin et al. | |
| 2015/0370882 A1 | 12/2015 | Kalki et al. | |
| 2016/0011905 A1 | 1/2016 | Mishra et al. | |
| 2016/0171383 A1 | 6/2016 | Narain et al. | |
| 2016/0358106 A1 | 12/2016 | Anderson et al. | |
| 2017/0012847 A1 | 1/2017 | Liensberger et al. | |
| 2017/0032016 A1 | 2/2017 | Zinner et al. | |
| 2017/0039249 A1 | 2/2017 | Bhagwan et al. | |
| 2017/0046344 A1 | 2/2017 | Butler et al. | |
| 2017/0118094 A1 | 4/2017 | Rao et al. | |
| 2017/0177309 A1 | 6/2017 | Bar-Or et al. | |
| 2017/0177546 A1 | 6/2017 | Heinz et al. | |
| 2018/0341744 A1 | 11/2018 | Regev et al. | |
| 2019/0258904 A1* | 8/2019 | Ma | G06K 9/6269 |
| 2019/0346297 A1* | 11/2019 | Lekivetz | G06F 11/2025 |
| 2020/0117580 A1* | 4/2020 | Lekivetz | G06N 3/0445 |

OTHER PUBLICATIONS

Milliken, George A. et al., Analysis of Messy Data: vol. I, Designed Experiments, 1992, Chapter 22 (Analysis of Mixed Models) and Chapter 23 (Two Case Studies of a Mixed Model), pp. 274-295.

Searle, Shayle R. et al., An Overview of Variance Component Estimation, Apr. 1994 https://ecommons.cornell.edu/bitstream/handle/1813/31816/BU-1231-M.pdf;sessionid=466ECEA15D5BOC70C2258A7D05AD05CA?sequence=1.

Mahamunulu, D.M., Sampling Variances of the Estimates of Variance Components in the Unbalanced 3-way Nested Classification, The Annals of Mathematical Statistics, vol. 34, No. 2 (Jun. 1963), pp. 621-527, https://projecteuclid.org/download/pdf_1/euclid.aoms/1177704163.

Measurement Systems Analysis Reference Manual, 4th Edition, 2010 http://www.rubymetrology.com/add_help_doc/MSA_Reference_Manual_4th_Edition.pdf.

Butler, George R. et al., U.S. Appl. No. 14/826,770, filed Aug. 14, 2015, entitled Method for Performing In-Database Distributed Advanced Predictive Analytics Modeling via Common Queries.

Rastunkov, Vladimir S. et al., U.S. Appl. No. 15/067,643, filed Mar. 11, 2016, entitled Auto Query Construction for In-Database Predictive Analytics.

Compellon, Compellon20/20 Customer Analytics, http://www.compellon.com/, printed Jul. 13, 2016.

Datarobot, Machine Learning Software, http://www.datarobot.com/, printed Jul. 13, 2016.

Lewicki, Pawel et al., Statistics: Methods and Applications, wordpress.com, Sep. 27, 2013 (accessed from <<https://l4iam.files.wordpress.com/2013/09/statistics-methods-and-applications.pdf>> on Feb. 13, 2018).

Hai He et al., Automatic integration of Web search interfaces with WISE-Integrator, ch 25, 2004, The VLDB Journal (2004), all pages.

(56) References Cited

OTHER PUBLICATIONS

Beng Chin Ooi et al., Fast High-Dimensional Data Search in Incomplete Databases, 1998, Proceedings of the 24th VLDB Conference, National University of Singapore, all pages.

Bohm et al., Searching in High-dimensional Spaces—Index Structures for Improving the Performance of Multimedia Databases, 2015, University of Munich, all pages.

Ryan et al., Fully Bayesian Experimental Design for Pharmacokinetic Studies, Feb. 27, 2015.

Adali, T. et al., NOx and CO Prediction in Fossil Fuel Plants by Time Delay Neura Networks, vol. 6, Publisher: Integrated Computer-Aided Engineering, 1999, pp. 27-40.

Electric Power Research Institute (EPRI), Power Plant Optimization Industry Experience, 2005.

Friedman, J.H., Multivariate adaptive regression splines (with discussion), vol. 19, No. 1, Publisher: Annals of Statistics, 1991, pp. 1-141.

Friedman, J.H., Greedy function approximation: A gradient boosting machine, Publisher: IMS 1999 Reitz Lecture, Feb. 24, 1999.

Loh, Wei-Yin, et al., Split selection methods for classification trees, vol. 7, Publisher: Statistica Sinica, 1997, pp. 815-840.

Internet Product Brochure, Model predictive control tool, Matrikon control performance optimizer, Solution for constrained multivariable control, 2007.

Si, et al., Optimization of coal-fired boiler SCRS based on modified support vector machine models and genetic algorithms, vol. 88, Publisher: Fuel, 2009, pp. 808-816.

Yohannes, Y. et al., Classification and Regression Trees: An Introduction: Technical Guide #3, Publisher: International Food Policy Research Institute, Published in: Washington, D.C., Mar. 1999.

List of Patents or Applications Treated as Related filed in U.S. Appl. No. 15/139,672, filed Jun. 21, 2016.

List of Patents or Applications Treated as Related filed in U.S. Appl. No. 15/186,877, filed Jun. 21, 2016.

List of Patents or Applications Treated as Related filed in U.S. Appl. No. 14/826,770, filed Jun. 21, 2016.

List of Patents or Applications Treated as Related filed in U.S. Appl. No. 14/666,918, filed Jun. 21, 2016.

List of Patents or Applications Treated as Related filed in U.S. Appl. No. 15/067,643, filed Jun. 21, 2016.

\* cited by examiner

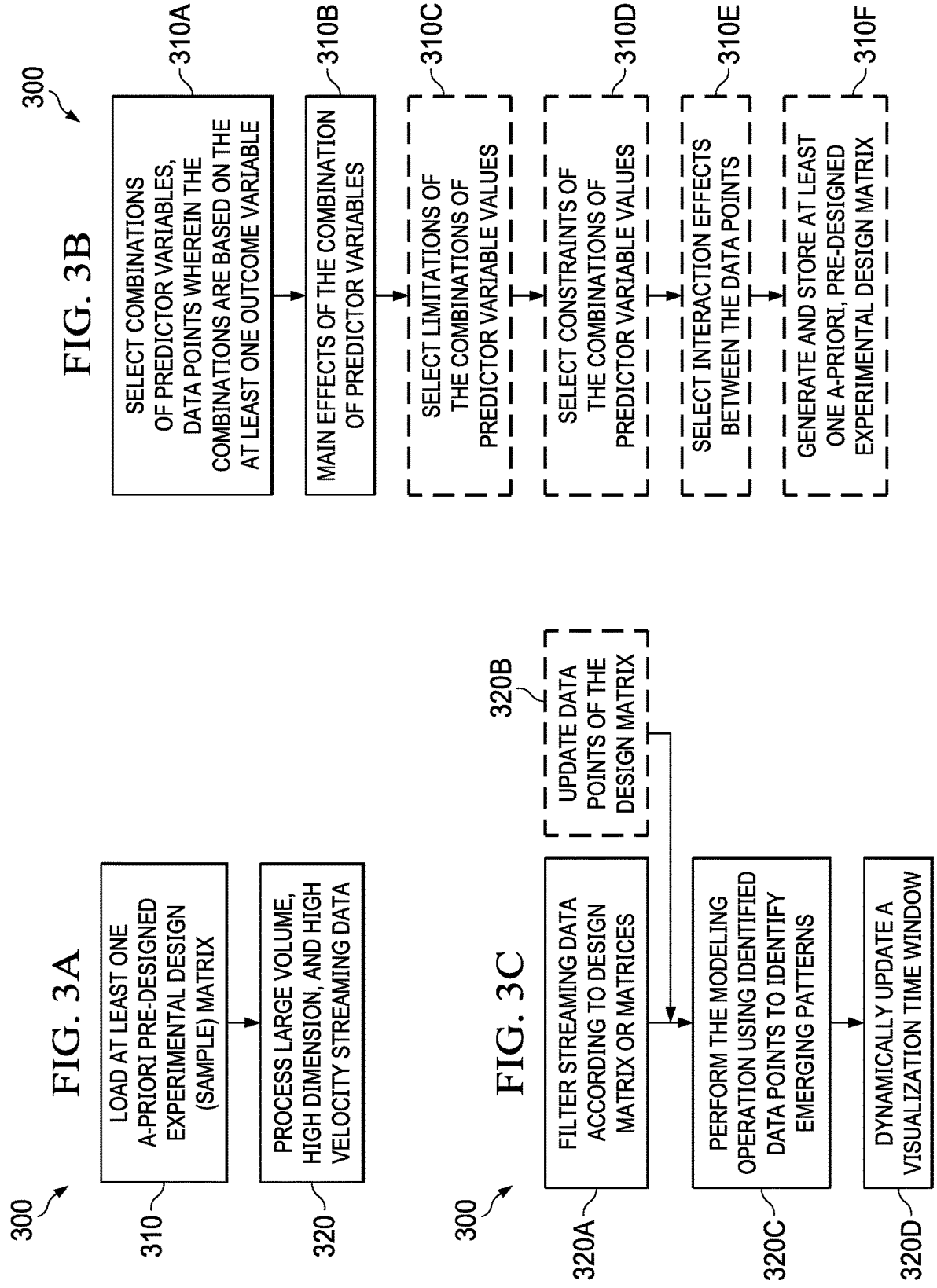

ADAPTIVE FILTERING AND MODELING VIA ADAPTIVE EXPERIMENTAL DESIGNS TO IDENTIFY EMERGING DATA PATTERNS FROM LARGE VOLUME, HIGH DIMENSIONAL, HIGH VELOCITY STREAMING DATA

TECHNICAL FIELD

The present disclosure relates to information handling systems. More specifically, embodiments of the disclosure relate to identify emerging data patterns from large volume, high dimensional, high velocity streaming data, continuously and in real-time.

BACKGROUND

One consideration when approaching analytic problems based on observed and/or historical data is to evaluate the "useful-life" of the information contained in the data. Specifically, the systematic and repeated relationships and patterns that are contained in the data may be static and invariant or relatively short-lived. If they are short-lived and/or continuously evolving, analyses of historical data sets are highly unlikely to uncover useful information with respect to the process under investigation.

For example, consider a hypothetical data set summarizing various parameters describing the weather and the average number of visitors to a beach. It is very likely and consistent with common experience that the number of beach goers will vary with weather parameters such as rainfall amount or temperature. In short, there will likely be fewer visitors to a beach in inclement weather when compared to weather conditions generally favorable for beach activities such as swimming or boating. Therefore, historical data sets describing weather conditions will likely be diagnostic of the number of visitors to a beach. Building a prediction model (to predict the number of visitors to a beach from weather conditions) using machine learning or statistical techniques applied to historical data at rest will likely yield prediction models of good accuracy.

In contrast to these examples of relatively stable relationships between variables that can be detected in historical static data sets, consider the often fast changing patterns in data describing consumer fashion preferences or salient voter concerns regarding political issues ("of the day"). In those examples, the relationships between predictor variables, and their relationships to the outcome variables of interest (fashion preferences, most important voter concerns) will constantly evolve and change, and the patterns in the data will likely be dynamically unstable.

Such dynamic instability is also common in many complex manufacturing processes involving large numbers of processing steps, for example in chemical or semiconductor manufacturing. In semiconductor manufacturing, the process of reliably creating complex micro-circuitry on silicon wafers requires hundreds of complex processing steps, and hundreds of thousands of parameters or more can be associated with quality characteristics of final wafers. Further, in those environments, never-before observed changes in parameters and their interactions can affect final process quality and yield, and such patterns would not be recorded and reflected in historical data.

In these examples and many similar situations, historical data sets recording information about data patterns that used to be diagnostic of final process outcomes are no longer useful for predicting future outcomes.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C show flow diagrams of the algorithm of an adaptive filtering system.

DETAILED DESCRIPTION

Figure 1:
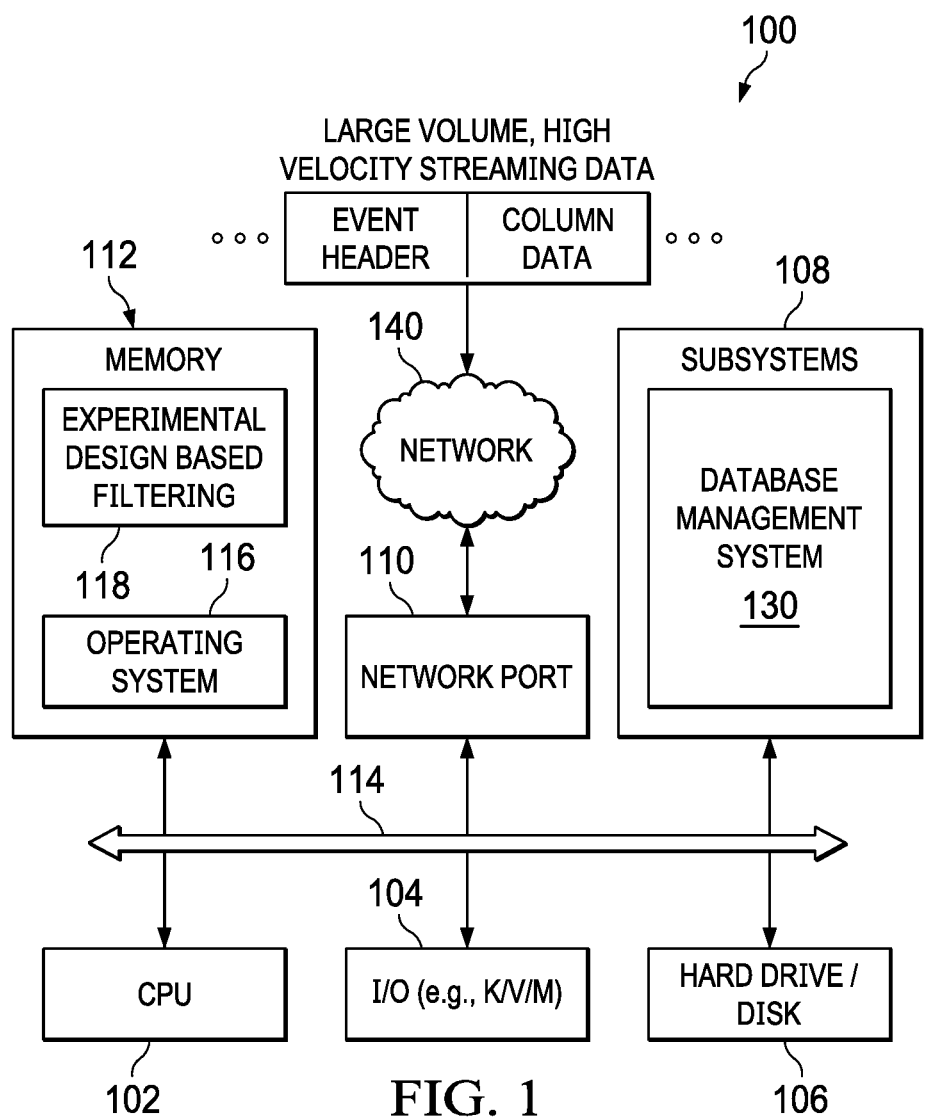
FIG. 1 shows a general illustration of components of an information handling system as implemented in the system and method of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure In many modern dynamic data analysis environments and scenarios, there are no useful historical data from which diagnostic actionable information and process predictions can be derived. Instead, it is often necessary to identify (or "look for") emerging patterns of relationships between variables in real-time in order to extract useful information that is diagnostic of future observations. There is an increasing interest in analytic algorithms that can dynamically adapt and "learn" as the relationships between variables in the data change; this is often referred to as "concept drift." However, there are significant challenges in terms of scalability and latency, when the number of variables that are continuously streaming to a learning algorithm becomes very large, and when the latencies between consecutive observations is very short. In those cases, it becomes impractical if not impossible to update incrementally (as new data points arrive) the complex learning algorithms, to continuously adapt to new or evolving patterns of relationships in the data.

In an embodiment, a computer-implemented algorithm is presented that exploits an experimental design matrix specifically configured to efficiently and effectively filter large volume, high dimension, high velocity streaming data to identify variables of interest, i.e. of diagnostic value, and to perform a modeling operation to identify data patterns and emerging data patterns, continuously and in real-time. The experimental design matrix is configured to have select data points, i.e. combinations of parameters (events) and values. The data points are defined by at least one of: main effects; at least one constraint; at least one limitation; and at least one interaction effect. The identified variables of interest are further processed using a modeling operation to identify the data patterns and emerging data patterns.

For the purpose of this disclosure, a data point is defined as a combination of variables, a variable is defined as a parameter and value, an event is defined as a parameter, and an observation is defined as a row of variables. Also, a predictor is defined as a value of a parameter. Main effects is defined as a simply relationship between a value or values, i.e. predictors, and a parameter or parameters, such as product quality and yield. A constraint is defined as a value or range of values that can define a variable. For example, a recipe for a drink will be a constraint so that all ingredients must sum to 100%. A limitation is defined as a minimum or maximum value that can define a variable. An interaction effect is defined as the combined effects of two or more values on an outcome of interest, i.e. a parameter. The combined effects can be additive, linear, and non-linear effects. For example, if an effect C=A+B, then C is not an interaction; but if C=A*B then it is; for example, age and ("multiplied by") gender will have a unique effect on the probability of child bearing, in addition to the correlation/effect of age and gender alone.

For the purposes of this disclosure, an experimental design matrix is defined as multiple rows of variables, defining a matrix of rows by variables of specific data values. Those data values are determined a-priori based on the statistical theory of Experimental Design. The general purpose of Experimental Design methods is to determine a-priori the least number of rows with specific combinations of values for variables that will extract the maximum amount of information from the data with respect to their combined relationship to outcomes such as product quality. These methods are generally useful when resource constraints prevent the processing of all data, for example in manufacturing when destructive product testing is applied. The theory and methods of experimental designs has a long history in statistics, and is summarized for example recently in Douglas Montgomery's *Design and Analysis of Experiments* ($9^{th}$ Edition), Wiley, 2017, as well as many other text books.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140 and receive streaming data from various data sources, such as real-time, high dimensional, high velocity streaming data from financial data feeds or complex manufacturing operations. The information handling system 100 likewise includes system memory 112, which is interconnected to the foregoing via one or more buses 114. System memory 112 further comprises operating system (OS) 116 and in various embodiments may also comprise an adaptive filtering and modeling module 118. Also, in certain embodiments, the information handling system 100 further includes a database management system 130 for accessing and interacting with various data repositories, such as big data repositories or dedicated process databases that can store time-stamped data values collected from sensors and other devices for large numbers of variables at different time intervals and using various technologies.

Figure 2:
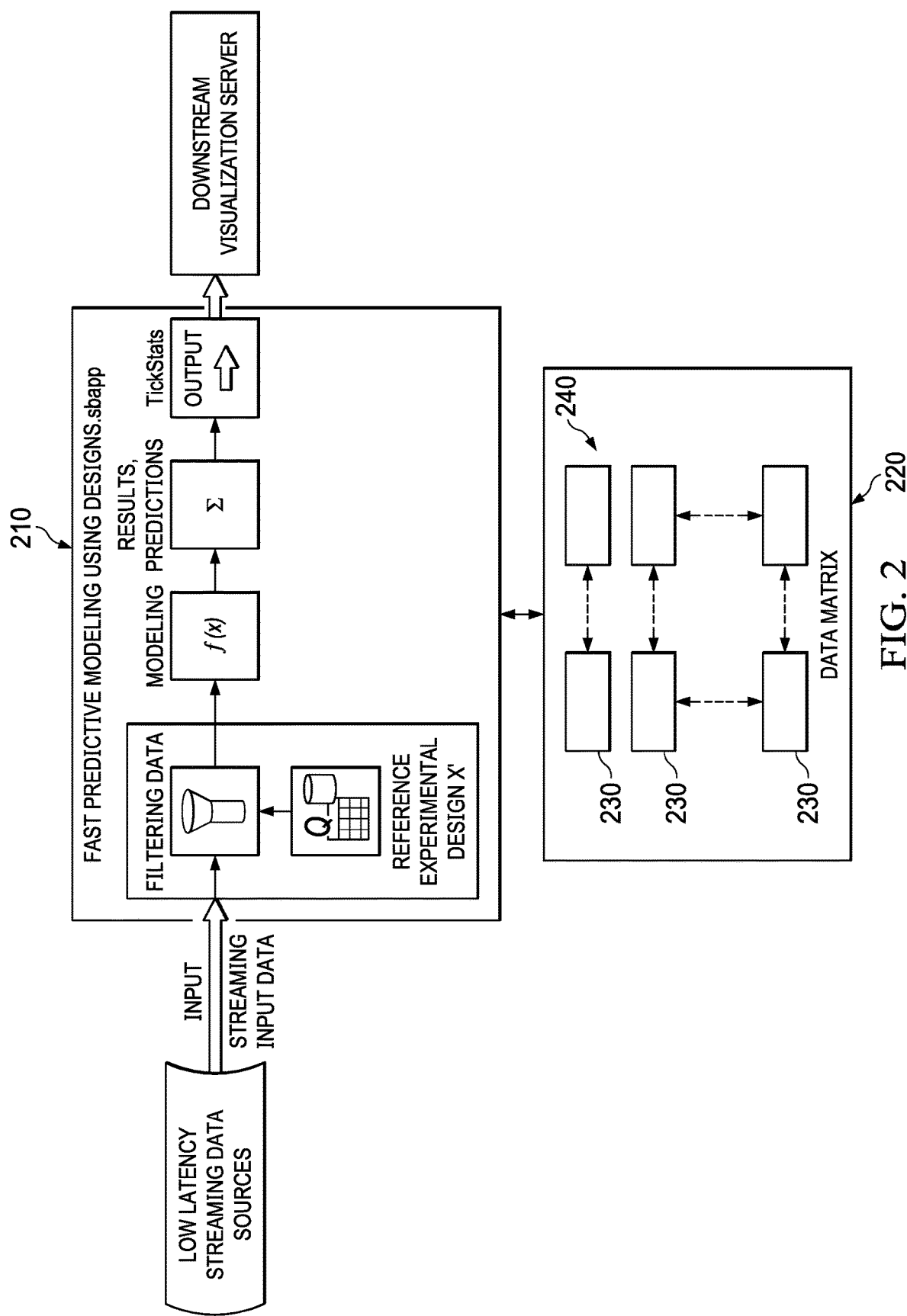
FIG. 2 shows a block diagram of an adaptive filtering environment.

Referring to FIG. 2, a block diagram of an adaptive filtering environment 200 is shown. More specifically, the adaptive filtering environment 200 includes an adaptive filtering system 210, which interacts with a data matrix 220. The data matrix 220 includes n rows 230 by m columns 240 of values of explanatory variables. The rows 230 represent observations of the data matrix and the columns 240 represent variables of the data. A variable includes an event header, i.e. parameter ID, tag, or name, and a value. In the case of streaming data for certain applications, as previously mentioned, combinations of variables defined therein can be analyzed to determine patterns and evolving patterns. The adaptive filtering system 210 selectively filters from that data matrix only those variables that can provide the information to potentially predict at least one outcome variable, e.g. typical and atypical data patterns, such as a potential anomaly in manufacturing operations or a sudden and drastic change in trading volume for a particular stock.

The adaptive filtering system 210 determines an arrangement of specific observations, i.e. rows of data points chosen into an experimental design matrix X'. A data point is a combination of two or more variables. The accuracy of any linear or non-linear model (which may be considered the information) for the adaptive filtering system 210 predicting outcome variables depends on the specific observations chosen into the experimental design matrix X'. By using optimal experimental design or space-filling design to generate a best experimental design matrix X' from a much larger data matrix X, the computational efficiency involved in filtering information, continuously and in real-time, from a streaming data source is independent of the size of X (i.e., the size of the actual high dimension (multi-variable), high velocity data stream), but is dependent on the resources used and the size of X' which is chosen by the user based on requirements regarding the desired precision of predictions, given the constraints, interaction effects, and other choices made by the user a-priori, determining the specific X' that will extract most efficiently the information of interest. It should be pointed out that the high dimension, high velocity data stream is comparable to or considered big data in that it is also large volume, but large volume data in motion.

Referring to FIGS. 3A-3C, flow diagrams of an algorithm 300 of the adaptive filtering system 210 are illustrated, according to certain example embodiments. In certain embodiments, the adaptive filtering system 210 includes some or all of the adaptive filtering and modeling module 118. The algorithm 300 of the adaptive filtering system 210 starts at block 310 where at least one a-priori, pre-designed experimental design matrix X' and at least one modeling operation are loaded into memory. The design matrix includes a number of data points that defines combinations of variables used by a modeling operation to predict at least one outcome variable. At block 320, large volume, high dimension, and high velocity streaming data is received and processed, continuously and in real-time. The algorithm 300 functions to compare variables having parameters, i.e. event header data, that are equivalent to that in the design matrix X' and with the same or similar values, as specified by at least one of a limitation, constraint, and interaction effect. Continuously, in this context, means in response to receiving the steaming data and real-time means processing relevant data points with as minimal delay as possible. E.g., in an embodiment, the header information can be processed similar to that of application data processed at the transport layer with the exception that data packets are further filtered based on the design matrix. I.e., application packets are processed at the network level to filter packets according to IP address and then further processed according to an API process listening on a transport service identifier. However, in this particular embodiment, the packets are further filtered according to the design matrix.

With respect to generation of a-priori, pre-designed experimental design matrices, combinations of predictor variables are selected, wherein the combinations are based on at least one outcome variable, block 310a. At block 310a, the variable types, such as continuous or discrete, can also be defined. At block 310b, main effects of the combination of predictor variables are selected, such as product quality and a desired value or value range. Next, limitations of the predictor variable values can be selected, block 310c. With respect to block 310c, the algorithm 300 can enumerate the dimensions of the predictor variables and value ranges of the variable values, i.e. minimums, maximums; or numbers of discrete values, in each of the selected predictor variables. A user can specify the possible value ranges and discrete values for the selected variables. At block 310d, constraints of the combinations of the predictor variable values can be selected. I.e., constraints can be placed on a value or values in one variable based on a value or values in another variable, or constraints can be placed on combinations of variables, e.g., that the sum of the values for two or more variables must sum to a constant. In manufacturing, constraints often (usually) describe a multivariate "region" that is permitted or not permitted (e.g., because of practical design constraints. The sum constraint is one example of such a constraint, when the values for multiple variables must add to a constant (called a mixture-constraint). Furthermore, interaction effects, i.e. where the combined effects of two variables on an outcome of interest is not additive, as well as non-linear effects and interaction effects of the variables can also be selected, block 310e. The algorithm 300 can use the limitations and constraints in estimating the main-effects, interactions to a specified degree, linear and nonlinear effects, etc. from a number of continuously updated data points. At block 310f, the algorithm 300 generates the experimental design matrix X' with the defined limitations, constraints using an experimental design and deployment engine, e.g., TIBCO Statistica®, and stores the design matrix for subsequent use. It should also be understood that the design matrix can be generated using any of the experimental design types commonly known and described in the statistical literature, including a space-filling design or an optimal experimental design technique. As indicated, blocks 310c-f can be optional based on user needs.

With respect to the processing of the streaming data, the streaming data is filtered according to the design matrix X' or multiple matrices $X'^1$ ... $X'^m$, block 320a. Data that includes relevant event (parameter) data are further examined to determine if their associated values meet the pre-defined constraints, limitations, and interaction effects. The data matrix or matrices are updated accordingly, block 320b. After the matrix or matrices have been updated, a modeling operation is performed, e.g. a prediction modeling operation and a clustering modeling operation, on the updated data, block 320c. At block 320d, a visualization time window is dynamically updated. The algorithm 300 can use analytics engine such as TIBCO Statistica™ and visualization engine such as TIBCO Spotfire® Data Streams to perform the modeling operations and the visualization operations.

The following are simple use case examples of how the disclosed systems, devices, and methods presented herein implement an efficient and automatic learning or modeling mechanism with streaming data. The solutions presented herein provide significant value and advantages across several domains where relatively short-lived relationships between variables determine important outcome variables. Such examples might be (but are not limited to):

In manufacturing, where continuous data streams report on the continuous operation of tools and machines involved in an automated manufacturing process, or in a continuous manufacturing process, such as semiconductor manufacturing or chemical manufacturing;

In marketing, where continuous data streams report on the continuous interactions between customers with a commerce website;

In financial services, where continuous data streams report on the continuous processing of financial transactions of different types, the amounts of money involved, and other metadata associated with the respective transactions; and In insurance services, where continuous data streams report on the continuous processing of insurance claims and the various characteristics and properties of the claims and claimants.

For example, if a product quality characteristic is monitored by computer-implemented algorithm (300) as a function of variables defined in the experimental design matrix, efficient, real-time computations can be performed to estimate the importance or predictive power of each variable for the prediction of product quality, and the results presented in a Pareto visualization chart. The computer-implemented algorithm can show and continuously update the visualization chart to illustrate the importance of each variable or their interactions for product quality. Thus, the computer-implemented algorithm can provide an efficient and practical continuous view of current and emerging patterns detected in the streaming data, as the data streams through a streaming data engine.

As another example, a space-filling design can be specified, along with replications at specific regions of interest of the input space and a sliding data window. As the computer-implemented algorithm (300) selects combinations of variables consistent with the experimental design, those data points are continuously processed using a prediction modeling operation. The prediction modeling operation is continuously updated, i.e. the output is adapted to the updated input. Engine, which updates a prediction model of some outcome of interest (e.g., updates the prediction of risk with respect to equipment failure). As the streaming data processing continuous, when a new observation consistent with a point prescribed by the space-filling design is identified and selected, the respective prediction model will be re-estimated based on the most recent data window (recalibration, or re-basing of models). In this manner, an efficient and scalable adaptive analysis learning engine to predict equipment failure can be continuously updated as new diagnostic (informative) data points are observed.

As will be appreciated by one skilled in the art, the present disclosure may be embodied as a method, system, or computer program product. Accordingly, embodiments of the disclosure may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present disclosure is well adapted to attain the advantages mentioned as well as others inherent therein. While the present disclosure has been depicted, described, and is defined by reference to particular embodiments of the disclosure, such references do not imply a limitation on the disclosure, and no such limitation is to be inferred. The disclosure is capable of considerable modification, alteration, and equivalents in form and function, as will occur to those ordinarily skilled in the pertinent arts. The depicted and described embodiments are examples only, and are not exhaustive of the scope of the disclosure.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a computer-implementable method for identifying information in high dimensional, low latency streaming data having dynamically evolving data patterns, the method comprising: processing, continuously and in real-time, the streaming data, wherein processing comprises: filtering streaming data based on event data to identify diagnostic data points by comparing the event data with an experimental design matrix; performing a modeling operation using the identified diagnostic data points to identify current and emerging patterns of relationships between at least one outcome variable and predictor variables;

Clause 2, the computer-implementable method of clause 1 further comprising: loading at least one a-priori, pre-designed experimental design matrix and at least one modeling operation into memory; wherein the at least one a-priori, pre-designed experimental design matrix is generated based on combinations of the predictor variables, wherein the combinations are based on the at least one outcome variable;

Clause 3, the computer-implementable method of clause 1 wherein the modeling operation is one of a prediction modeling operation and a clustering modeling operation;

Clause 4, the computer-implementable method of clause 2 wherein the experimental design matrix is generated based on at least one of: limitations of the combinations of predictor variable values; constraints of the combination of predictor variable values; and interaction effects between selected predictor variables;

Clause 5, the computer-implemented method of clause 4 wherein limitations of the predictor variable values are determined based on range values for the predictor variables, wherein the predictor variable values are continuous predictor variables;

Clause 6, the computer-implemented method of clause 4 wherein constraints of the combination of predictor variable values are based on a region of interest, wherein the predictor variable values are discrete predictor variable values;

Clause 7, the computer-implemented method of clause 1 wherein the experimental design matrix is generated based on one of a one space-filling design and an optimal experimental design;

Clause 8, the computer-implemented method of clause 1 wherein processing further comprises dynamically updating a visualization time window of the streaming data;

Clause 9, a system for identifying information in high dimensional, low latency streaming data having dynamically evolving data patterns, the system comprises: one or more processors; a memory coupled to the one or more computer processors and comprising instructions, which when performed by the one or more computer processors, cause the one or more processors to perform operations to: filter, continuously and real-time, streaming data based on event data to identify diagnostic data points by comparing the event data with an experimental design matrix; and perform, continuously and in real-time, a modeling operation using the identified diagnostic data points to identify current and emerging patterns of relationships between the at least one outcome variable and the predictor variables;

Clause 10, the system of clause 9 wherein the instructions further cause the one or more processors to: load at least one a-priori, pre-designed experimental design matrix and at least one modeling operation into memory; wherein the at least one a-priori, pre-designed experimental design matrix is generated based on combinations of the predictor variables, wherein the combinations are based on the at least one outcome variable;

Clause 11, the system of clause 9 wherein the modeling operation is one of a prediction modeling operation and a clustering modeling operation;

Clause 12, the system of clause 10 wherein the experimental design matrix is selected based on at least one of: limitations of the combinations of predictor variable values; constraints of the combination of predictor variable values; and interaction effects between selected predictor variables;

Clause 13, the system of clause 12 wherein limitations of the predictor variable values are determined based on range values for the predictor variables, wherein the predictor variable values are continuous predictor variables;

Clause 14, the system of clause 12 wherein constraints of the combination of predictor variable values are based on a region of interest, wherein the predictor variable values are discrete predictor variable values;

Clause 15, the system of clause 9 wherein the experimental design matrix is generated based on one of a one space-filling design and an optimal experimental design;

Clause 16, the system of clause 9 wherein the instructions further cause the at least one processor to perform operations to dynamically update a visualization time window of the streaming data;

Clause 17, at least one non-transitory computer readable medium comprising instructions for identifying information in high dimensional, low latency streaming data having dynamically evolving data patterns, when executed by at least one processor, cause the at least one processor to perform operations to: filter, continuously and real-time, streaming data based on event data to identify diagnostic data points by comparing the event data with an experimental design matrix; and perform, continuously and in real-time, a modeling operation using the identified diagnostic data points to identify current and emerging patterns of relationships between the at least one outcome variable and the predictor variables;

Clause 18, the at least one non-transitory computer readable medium of clause 15 further comprising instructions to cause the at least one processor to: load at least one a-priori, pre-designed experimental design matrix and at least one modeling operation into memory; wherein the at least one a-priori, pre-designed experimental design matrix is generated based on combinations of the predictor variables, wherein the combinations are based on the at least one outcome variable;

Clause 19, the at least one non-transitory computer readable medium of clause 17 wherein the modeling operation is one of a prediction modeling operation and a clustering modeling operation; and Clause 20, the at least one non-transitory computer readable medium of clause 18 wherein the experimental design is selected based on at least one of: limitations of the combinations of predictor variable values; constraints of the combination of predictor variable values; and interaction effects between selected predictor variables.

What is claimed is:

1. A computer-implementable method for identifying information in high dimensional data streams having dynamically evolving data patterns, the method comprising:
    loading at least one a-priori, pre-designed experimental design matrix and at least one modeling operation into memory;
    processing streaming data continuously, wherein processing comprises:
        filtering the streaming data based on event data to identify diagnostic data points by comparing the event data with the at least one a-priori, pre-designed experimental design matrix; and
    performing the modeling operation using the identified diagnostic data points to identify current and emerging patterns of relationships between at least one outcome variable and predictor variables,
    wherein the at least one a-priori, pre-designed experimental design matrix is generated based on combinations of the predictor variables, wherein the combinations are based on an outcome variable, wherein the at least one a-priori, pre-designed experimental design matrix is generated further based on at least one of:
    main effects of predictor variable values;
    limitations of the combinations of predictor variable values;
    constraints of the combination of predictor variable values; and
    interaction effects between selected predictor variables.

2. The computer-implementable method of claim 1 wherein the modeling operation is one of a prediction modeling operation and a clustering modeling operation.

3. The computer-implemented method of claim 1 wherein limitations of the predictor variable values are determined based on range values for the predictor variables, wherein the predictor variable values are continuous predictor variables.

4. The computer-implemented method of claim 1 wherein constraints of the combination of predictor variable values are based on a region of interest, wherein the predictor variable values are discrete predictor variable values.

5. The computer-implemented method of claim 1 wherein the at least one a-priori, pre-designed experimental design matrix is generated based on one of a space-filling design and an optimal experimental design.

6. The computer-implemented method of claim 1 wherein processing further comprises dynamically updating a visualization time window of the streaming data.

7. A system for identifying information in high dimensional data streams having dynamically evolving data patterns, the system comprises:
 one or more processors;
 a memory coupled to the one or more computer processors and comprising instructions, which when performed by the one or more computer processors, cause the one or more processors to perform operations to:
  load at least one a-priori, pre-designed experimental design matrix and at least one modeling operation into memory;
  filter streaming data based on event data continuously to identify diagnostic data points by comparing the event data with the at least one a-priori, pre-designed experimental design matrix; and
  perform the modeling operation using the identified diagnostic data points to identify current and emerging patterns of relationships between at least one outcome variable and predictor variables,
 wherein the at least one a-priori, pre-designed experimental design matrix is generated based on combinations of the predictor variables, wherein the combinations are based on an outcome variable, wherein the at least one a-priori, pre-designed experimental design matrix is generated further based on at least one of:
 main effects of predictor variable values;
 limitations of the combinations of predictor variable values;
 constraints of the combination of predictor variable values; and
 interaction effects between selected predictor variables.

8. The system of claim 7 wherein the modeling operation is one of a prediction modeling operation and a clustering modeling operation.

9. The system of claim 7 wherein limitations of the predictor variable values are determined based on range values for the predictor variables, wherein the predictor variable values are continuous predictor variables.

10. The system of claim 7 wherein constraints of the combination of predictor variable values are based on a region of interest, wherein the predictor variable values are discrete predictor variable values.

11. The system of claim 7 wherein the at least one a-priori, pre-designed experimental design matrix is generated based on one of a space-filling design and an optimal experimental design.

12. The system of claim 7 wherein the instructions further cause the at least one processor to perform operations to dynamically update a visualization time window of the streaming data.

13. At least one non-transitory computer readable medium comprising instructions for identifying information in high dimensional streaming data having dynamically evolving data patterns, when executed by at least one processor, cause the at least one processor to perform operations to:
 load at least one a-priori, pre-designed experimental design matrix and at least one modeling operation into memory;
 filter, continuously and real-time, streaming data based on event data to identify diagnostic data points by comparing the event data with the at least one a-priori, pre-designed experimental design matrix; and
 perform, continuously and in real-time, the modeling operation using the identified diagnostic data points to identify current and emerging patterns of relationships between at least one outcome variable and predictor variables,
 wherein the at least one a-priori, pre-designed experimental design matrix is generated based on combinations of the predictor variables, wherein the combinations are based on an outcome variable, wherein the at least one a-priori, pre-designed experimental design matrix is generated further based on at least one of:
 main effects of predictor variable values;
 limitations of the combinations of predictor variable values;
 constraints of the combination of predictor variable values; and
 interaction effects between selected predictor variables.

14. The at least one non-transitory computer readable medium of claim 13 wherein the modeling operation is one of a prediction modeling operation and a clustering modeling operation.

* * * * *